(12) United States Patent
Yoon et al.

(10) Patent No.: US 8,406,497 B2
(45) Date of Patent: Mar. 26, 2013

(54) METHOD FOR POPULATION-DRIVEN IDENTIFICATION OF BODY LANDMARKS

(76) Inventors: Dongwook Yoon, Seoul (KR); Hyeong-Seok Ko, Seoul (KR)

( * ) Notice: Subject to any disclaimer, the term of this patent is extended or adjusted under 35 U.S.C. 154(b) by 700 days.

(21) Appl. No.: 12/575,360

(22) Filed: Oct. 7, 2009

(65) Prior Publication Data

US 2010/0215235 A1 Aug. 26, 2010

Related U.S. Application Data

(60) Provisional application No. 61/155,239, filed on Feb. 25, 2009.

(51) Int. Cl.
*G06K 9/00* (2006.01)
*G06K 9/32* (2006.01)

(52) U.S. Cl. ........................ 382/131; 382/293; 382/294

(58) Field of Classification Search .................. 382/131, 382/293, 294
See application file for complete search history.

(56) References Cited

U.S. PATENT DOCUMENTS

| | | | | |
|---|---|---|---|---|
| 6,553,152 B1* | 4/2003 | Miller et al. | ................... | 382/294 |
| 7,702,380 B1* | 4/2010 | Dean | ............................. | 600/426 |
| 2005/0237328 A1* | 10/2005 | Guhring | ......................... | 345/520 |
| 2006/0002632 A1* | 1/2006 | Fu et al. | ......................... | 382/294 |
| 2006/0064007 A1* | 3/2006 | Comaniciu et al. | ............. | 600/416 |
| 2006/0269165 A1* | 11/2006 | Viswanathan | ................ | 382/293 |
| 2007/0223794 A1* | 9/2007 | Preiss et al. | .................... | 382/128 |
| 2010/0027861 A1* | 2/2010 | Shekhar et al. | ............... | 382/131 |

OTHER PUBLICATIONS

Besl et al., A Method for Registration of 3-D Shapes, IEEE Transaction on Pattern Analysis and Machine Intelligence, vol. 14, No. 2, Feb. 1992, pp. 239-256.*
Berar et al., 3D Meshes Registration: Application to statistical skull model, Laboratoire des Images et des Signaux, 2004, pp. 1-9.*

* cited by examiner

*Primary Examiner* — Alexander H Taningco
(74) *Attorney, Agent, or Firm* — John K. Park; Park Law Firm (57) ABSTRACT

A new method for the identification of body landmarks from three-dimensional (3D) human body scans without human intervention is provided. The method is based on a population in whom landmarks were identified and from whom 3D geometries were obtained. An unmarked body (subject) is landmarked if there is a landmarked body in the population whose geometry is similar to that of the subject. The similarity between the surface geometry of the subject and that of each individual in the population can be determined. A search is performed using the mesh registration technique to find a part-mesh with the least registration error; the landmarks of the best-matched result are then used for the subject.

6 Claims, 4 Drawing Sheets

Table 1: Average landmarking errors in 250 subjects

| BL | error(mm) | BL | error(mm) |
|---|---|---|---|
| Sellion | 6.69 | Rt. Infraorbitale | 5.60 |
| Lt. Infraorbitale | 6.37 | Supramenton | 5.49 |
| Rt. Tragion | 7.32 | Rt. Gonion | 11.34 |
| Lt. Tragion | 6.50 | Lt. Gonion | 8.44 |
| Nuchale | 16.01 | Rt. Clavicale | 6.56 |
| Suprasternale | 12.18 | Lt. Clavicale | 9.28 |
| Rt. Thelion/Bustpoint | 7.78 | Lt. Thelion/Bustpoint | 10.71 |
| Substernale | 9.84 | Rt. 10th Rib | 22.21 |
| Rt. ASIS | 32.97 | Lt. 10th Rib | 18.38 |
| Lt. ASIS | 34.52 | Rt. Iliocristale | 14.61 |
| Rt. Trochanterion | 14.71 | Lt. Iliocristale | 18.60 |
| Lt. Trochanterion | 14.39 | Cervicale | 11.87 |
| 10th Rib Midspine | 13.91 | Rt. PSIS | 27.96 |
| Lt. PSIS | 28.40 | Waist, Preferred, Post. | 26.02 |
| Rt. Acromion | 21.17 | Rt. Axilla, Ant | 39.31 |
| Rt. Radial Styloid | 10.97 | Rt. Axilla, Post. | 21.87 |
| Rt. Olecranon | 7.90 | Rt. Humeral Lateral Epicn | 10.43 |
| Rt. Humeral Medial Epicn | 11.24 | Rt. Radiale | 9.04 |
| Rt. Ulnar Styloid | 7.51 | Lt. Acromion | 10.97 |
| Lt. Axilla, Ant | 30.14 | Lt. Radial Styloid | 7.29 |
| Lt. Axilla, Post. | 22.50 | Lt. Olecranon | 10.45 |
| Lt. Humeral Lateral Epicn | 7.48 | Lt. Humeral Medial Epicn | 11.32 |
| Lt. Radiale | 8.27 | Lt. Ulnar Styloid | 8.40 |
| Rt. Knee Crease | 6.86 | Rt. Femoral Lateral Epicn | 11.49 |
| Rt. Femoral Medial Epicn | 17.69 | Rt. Lateral Malleolus | 7.21 |
| Rt. Medial Malleolus | 6.77 | Rt. Sphyrion | 5.66 |
| Rt. Calcaneous, Post. | 13.95 | Lt. Knee Crease | 6.47 |
| Lt. Femoral Lateral Epicn | 9.00 | Lt. Femoral Medial Epicn | 15.97 |
| Lt. Lateral Malleolus | 6.08 | Lt. Medial Malleolus | 7.10 |
| Lt. Sphyrion | 8.27 | Lt. Calcaneous, Post. | 8.17 |
| Crotch | 23.68 | Overall average | 13.43 |

Fig. 5

METHOD FOR POPULATION-DRIVEN IDENTIFICATION OF BODY LANDMARKS

RELATED APPLICATION

This application is a Non-provisional application of the provisional patent Application No. 61/155,239 for "Population-Driven Identification of Body Landmarks for Human Body Scans" filed on Feb. 25, 2009.

BACKGROUND OF THE INVENTION

The present invention relates to a method for population-driven identification of body landmarks. More particularly, this invention relates to a method for population-driven identification of body landmarks, which body landmarks are identified from three-dimensional human body scans.

SUMMARY OF THE INVENTION

The present invention contrives to solve disadvantages of the prior art.

An objective of the invention is to provide a method for population-driven identification of body landmarks.

An aspect of the invention provides a method for population-driven identification of body landmarks comprising steps of:

providing a set of landmark information for a landmarked population, wherein three-dimensional landmarks are identified for each individual in the landmarked population, such that three-dimensional geometry of the each individual is obtained, wherein the landmark information of the each individual comprises a plurality of three-dimensional part meshes;

scanning a plurality of three-dimensional scans of a subject body, a human body;

generating a preliminary parameterized body from the plurality of three-dimensional scans; and part-wise matching to find a best-matched landmarked part-mesh in the landmarked population to a given body part of the subject body and apply a body landmark (BL) thereof to the given body part.

The step of providing may comprise steps of:

parameterizing each individual of the landmarked population through mesh transformation for establishing correspondence between body points of two arbitrary individuals in the landmarked population; and performing topological body segmentation on each individual of the landmarked population in order to obtain the three-dimensional part meshes.

The step of parameterizing may comprise steps of:

obtaining a template mesh;

transforming the mesh to optimally fit the landmarked individual; and constraining the template mesh landmarks to coincide with landmarks of the landmarked individual.

The body landmark may represent corresponding anatomical positions in terms of mesh topological structure of the mesh.

The step of part-wise matching may comprise steps of:

aligning/scaling the landmarked part-mesh around the subject body; and selecting a part-mesh with a lowest registration error, wherein the registration error is given as $$e_j^I = \frac{1}{m} \sum_{k=1, v_k \in P_j}^{m} Pc_k - T(\varphi(\Theta_I, v_k))P, \text{ where } T \text{ represents } a$$

transformation applied to a topological part-mesh $P_j$, m denotes the total number of vertices in that part-mesh, $v_k$ represents the k-th vertex in $P_j$ and $c_k$ denotes the corresponding vertex in D, $(x)_I$ is a geometry vector according to which a topological part-mesh $\kappa \in K$ is realized into an actual 3D part-mesh of the i-th body by constraining vertices, and $\phi((x)_I, \kappa)$ is a mapping in which a topological part-mesh $\kappa \in K$ can be realized into an actual 3D part-mesh of the I-th body by constraining vertices according to $\hat{x}_I$.

The step of aligning/scaling may comprise an iterative-closest-point (ICP) algorithm.

The step of performing topological body segmentation may comprise a step of dividing the subject body into non-symmetric shapes.

The step of generating may comprise steps of:

obtaining an average geometry vector $\overline{(x)}$ of $(x)_1, \ldots, (x)_N$ and the deviation vectors $u_1, \ldots, u_N$, forming a deviation matrix U;

performing a principal component analysis (PCA) and obtaining the components $p_1, \ldots, p_h$, (h=N) in the descending order of corresponding variances $\sigma_1^2, \ldots, \sigma_h^2$; and generating the preliminary parameterizie body surface geometry using the weighted sum $$r = \overline{\Theta} + \sum_{q=1}^{h} w_q p_q,$$

where weights $w_1, \ldots, w_h$ are obtained by optimizing the weighted sum $\alpha E_p + (1-\alpha)E_d$, where the PCA deviation error $E_p$ and data error $E_d$ are defined as $$E_p = \sum_{q=1}^{h} (w_q / \sigma_q)^2,$$

and $$E_d = \sum_{k=1}^{n} dist^2(r_k, D),$$

where n is the number of vertices in r, and dist( ) is a function which returns the shortest distance between a vertex $r_k$ of r and the surface of D.

The advantages of the present invention are: (1) the method for population-driven identification of body landmarks is provided; and (2) the method for population-driven identification of body landmarks does not require a human intervention.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

U.S. Provisional Application No. 61/155,239 was filed on Feb. 25, 2009 for an invention entitled "Population-Driven Identification of Body Landmarks for Human Body Scans." The disclosures of the application are incorporated by reference as if fully set forth herein.

1. INTRODUCTION

Every human body is different. Although variations in physical characteristics are observed across entire body, the clothing community has abstracted this diversity into a discrete, tractable set of prominent points termed body landmarks (BLs). BLs can be identified by visual examination or palpation. For example, the belly button is a prominent feature in the abdomen, and the cervical is the surface point at the seventh vertebra of the spine. As BLs compactly summarize body shape, identification of BLs is of fundamental significance in clothing production. A new method for identifying BLs in a given human body scan is provided.

Some BLs are based on surface features (e.g., the belly button), but most BLs refer to skeletal features (e.g., the cervical). X-Ray or CT/MRI equipment is not used. Then, since a 3D laser/optical body scan does not explore underlying skeletal structure, precise identification of BLs based on the scanned geometry alone is a daunting task.

The task of identifying the BLs of a particular subject based on his or her scanned geometry can potentially be facilitated by considering data from a population in whom BLs have been identified and three-dimensional (3D) body geometries have been scanned. Several body scanning/measurement projects have been conducted worldwide (e.g., CAESAR, Size USA, and Size Korea), and some studies have produced data packages consisting of a set of 3D-scanned bodies along with annotated BLs. Such a package is termed landmarked population. The goal of this work was to develop a technique to landmark a newly scanned body based on landmarked population.

The utilization of a landmarked population is based on both the landmark-surface dependency principle and the locality principle. The landmark-surface dependency principle states that, for example, when two upper arms belonging to two different individuals are identical, the BLs of the two upper arms should be identical. Although it is possible that skeletal structures are not identical, the rationale behind the principle is that, when skeletal discrepancy is not evident, available surface data is relied on. In certain embodiments, when the shapes of two body parts of two different subjects are similar, it is assumed that their landmarks are similar.

The locality principle states that BLs of distant body parts (of the same person) are not necessarily related. The principle implies that, for example, landmarking of an arm does not need to be performed in close association with landmarking of a leg. In this work, if the surface geometries of two arms (belonging to two different individuals) are identical, even if other body part surfaces are not identical, it is assumed that arm BLs are identical.

For any given unmarked body, the example-driven landmarking technique finds the closest match in the landmarked population and applies the landmarks of the matched individual to the unmarked body. This is an application of the landmark-surface dependency principle. The locality principle dictates that the search need not to be performed over entire bodies but can be performed over each body part. This is called as part-wise matching.

2. RELATED WORK

Research on landmarking of human body scans has taken three different approaches: (1) pre-marked scanning, (2) geometric feature-based landmarking, and (3) machine learning-based landmarking. This section briefly reviews each approach.

To obtain landmarked scan data on humans, the pre-marked scanning approach makes use of landmarks identified prior to scanning. In the manual landmarking stage, trained measurers identify BLs and attach stickers to the body to mark the locations. Then, through optical signal, processing both the BL locations and body mesh are captured. The landmarks thus derived are very accurate, but the approach requires considerable human intervention.

Landmarking algorithms that are not based on prior manual-landmarking mostly take a geometric feature-based approach. This approach provides a different extraction function for each BL. The functions are easy to implement and fast to run. However, the functions are well-defined only around branching body regions such as the crotch or axilla. The extraction functions for BLs located away from branching regions are often blunt and produce imprecise landmarking results.

A conventional method utilizing a landmarked population, is based on a machine-learning approach. Thus, each BL is related to surface geometry using the so-called spin image surface descriptor. BL-surface relationship patterns are machine-learned using many population samples. For a given unmarked body, the method models the resulting pattern using a Markov network and solves the BL assignment for the unmarked body mesh by employing the belief-propagation technique. Both Azouz's group and BLs are characterized in the context of the surrounding surface, and landmarked populations are used. However, a major difference is that, Azouz's approach uses 2D descriptor, whereas 3D mesh data is employed directly in the present invention. Also, the high dimensional descriptor places BLs more strictly with respect to surface geometry.

3. OVERVIEW

Figure 2:
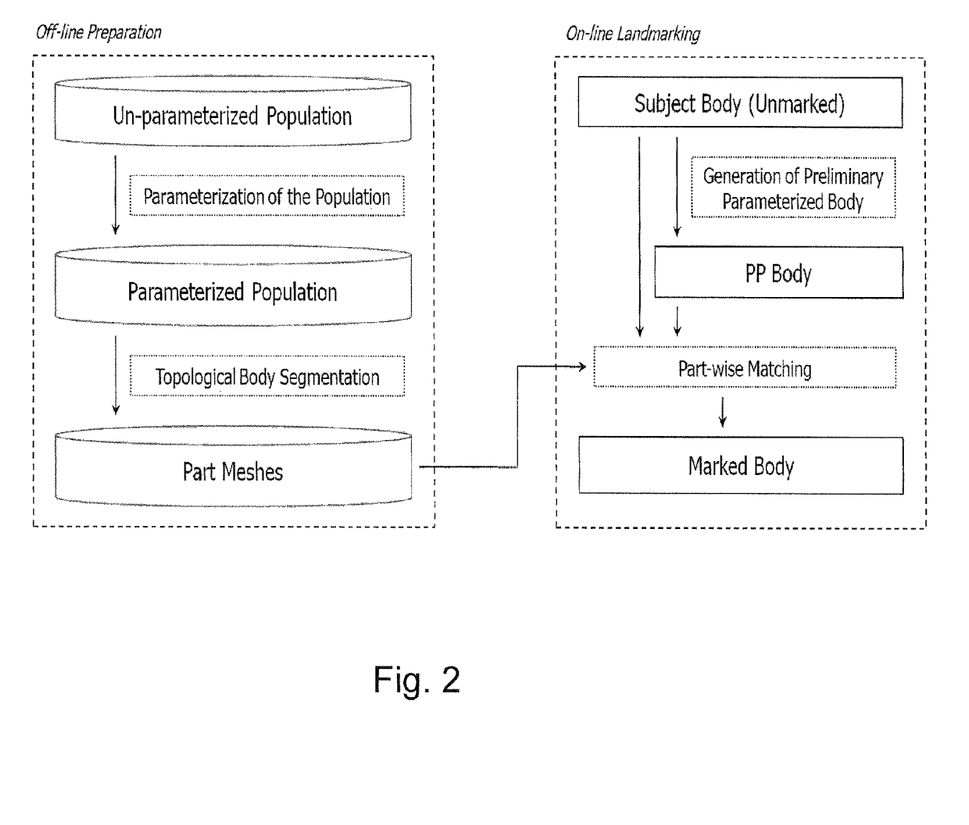
FIG. 2 is a block diagram illustrating an overview of he method according to an embodiment of the invention.

The landmarking procedure contains four major steps—parameterization of the population, topological body segmentation, generation of a preliminarily parameterized body and part-wise matching—the operations of which are depicted in FIG. 2. The first two steps run off-line and produce processed part-meshes which can be used in subsequent on-line landmarking. In the part-wise matching step, for a given unmarked body, the best-matched part-meshes are identified and aligned. A preliminarily parameterized body is constructed to provide an initial condition for part-wise matching.

4. OFF-LINE PREPARATION

The main goal of off-line preparation is to set the scene for part-wise matching presented in Section 5 below. The first step in part-wise matching is to determine how to decompose a body into part-meshes.

Decomposing the body into portions that are too large conflicts with the locality principle. However, a part-mesh should be sufficiently large to establish the matching context. Based on the above considerations, in an embodiment, a human body may be decomposed into 16 parts. Some part-meshes may overlap at boundaries, and the part-meshes may not entirely cover the body mesh. These imperfection is allowed because they help to find the best match. Iinclusion of unnecessary mesh portions can hinder this process; some overlapping portions are included to provide necessary matching context.

The attempt to utilize a landmarked population for landmarking of a novel body requires establishment of correspondence across different bodies. The correspondence problem can be stated as follows: if there are two human bodies A and B, which surface point on body B corresponds to a marked point x on body A? As introduced in Section 1, the correspondence is based on skeletal structure. Establishment of this correspondence is termed the parameterization. In an embodiment, the mesh transformation for the landmarked population parameterization is employed. Once parameterization is complete, the correspondence is established not only for BLs but for any arbitrary body points.

The remainder of this section describes the details of the two off-line steps of the method: the landmarked population parameterization and topological segmentation.

4.1 Population Parameterization

To establish correspondence between scanned bodies, the landmarked population is parameterized based on BLs. An excellent technique is available. When a landmarked template mesh has been obtained, the mesh transformation technique both transforms the mesh to optimally fit the landmarked individual and constrains template mesh landmarks to coincide with those of the individual. As a result, the fitted mesh has the geometry and landmarks of the scanned body but a topology identical to the template mesh. Here, the topology means the number and connectivity of the triangles comprising the mesh.

If the above transformation is applied to every individual in the population, a parameterized population is constructed, which forms the groundwork for part-wise comparison.

4.2 Topological Body Segmentation

The significance of body landmarks does not stem from their 3D positions, but rather from the fact that the landmarks represent corresponding anatomical positions in different human bodies. It thus seems natural to define BLs in terms of mesh topological structure of the mesh. BLs so defined is called as topological landmarks.

To define BLs in the topological structure, the following notation is introduced. The parameterized body of the I-th individual in the population has a geometry vector $(x)_I$ but shares the same topology K each other. In a template mesh of n vertices, $(x)_I$ is a 3n-dimensional column vector. The topology K is a simplicial complex, which is a collection of the subsets of the indices $\{0, \ldots, n-1\}$. There are three types of elements in K, namely, vertices $v=\{a\} \in K$, edges $e=\{a, b\} \in K$, and faces $\Delta=\{a, b, c\} \in K$.

A topological object can be realized into an 3D object by constraining the position of each vertex. In an embodiment, a topological part-mesh $\kappa \in K$ can be realized into an actual 3D part-mesh of the I-th body by constraining vertices according to $(x)_I$. Such a mapping is called as the geometrical realization, $\phi((x)_I, \kappa)$.

In an embodiment, the set L of all topological landmarks may be defined with $L=\{I_i=(\Delta_i, w_i) | \Delta_i \in K, w_i \in R^3\}$, where $\Delta_i$ is the triangle in which the i-th landmark resides and $w_i$ represents the barycentric coordinates of the landmark within the triangle. In the parameterized population, L is the same for every individual, as the population is parameterized based on the BLs.

In the context-based segmentation, the parts should adequately hold the anatomical context of the human body. If a part-mesh does not include sufficient salient geometric features, the surface-landmark dependency principle is inapplicable in matching. On the other hand, as the locality principle states, a region that is too wide may include areas irrelevant for BL identification, which may defocus the intended part context. These considerations led to manually decompose the template body into the 16 topological part-meshes, $P_j$. The same decomposition can be applied to a parameterized population, The j-th part-mesh of the I-th parameterized body is obtained with the realization $\phi((x)_I, P_j)$. This topology-based approach enables segmentation of the entire (parameterized) population without human intervention.

5. ON-LINE LANDMARKING

Chronologically, the landmarking procedure firstly generates a preliminarily parameterized body, and then part-wise matching is performed.

5.1 Part-wise Matching

The goal here is to find the best-matched landmarked part-meshes (LPMs) to the unmarked body D and to apply the landmarks thereof to D. This task involves aligning/scaling of an LPM around D and requires a metric that can measure match quality. To this end, the following registration error may be used. The registration error of the j-th part-mesh of the I-th individual in the population, in comparison with D, is defined as $$e_j^I = \frac{1}{m} \sum_{k=1, v_k \in P_j}^{m} Pc_k - T(\varphi(\Theta_I, v_k))P, \tag{1}$$

where T represents the transformation (a combination of translation, rotation, and uniform scaling) applied to the topological part-mesh $P_j$, and m denotes the total number of vertices in that part-mesh. $v_k$ represents the k-th vertex in $P_j$ and $c_k$ denotes the corresponding vertex in D. A set of best-matched part-meshes may be obtained by selecting part-meshes with the lowest registration errors.

Figure 3:
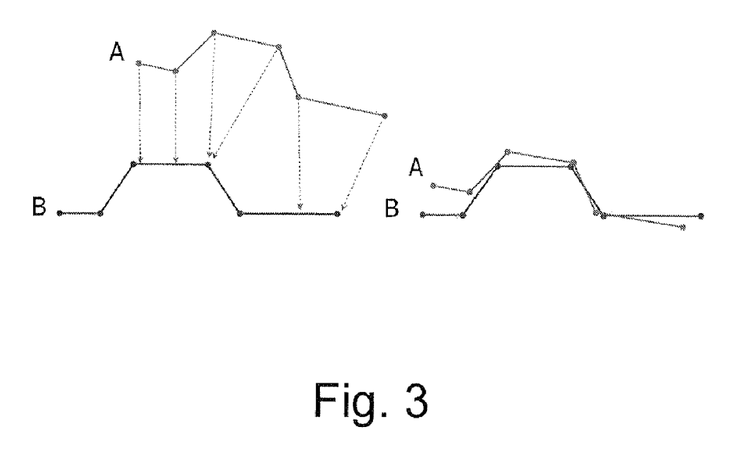
FIG. 3 is a diagram illustrating an ICP algorithm.
Figure 4:
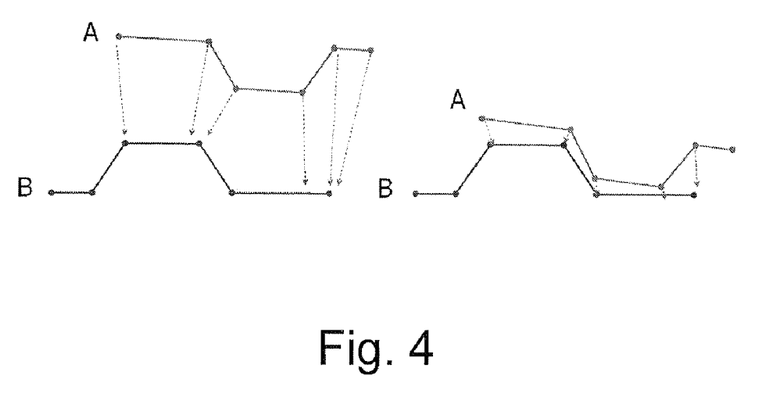
FIG. 4 is a diagram illustrating a local minimum resulted from the ICP algorithm of FIG. 3.

A widely used mesh registration method for aligning/scaling an LPM to D is available. This is the iterative-closest-point (ICP) algorithm. For a given LPM, the ICP approach locates a translated/rotated/scaled version which reduces registration error as shown in FIG. 3. By repeatedly applying this operation, the ICP method can obtain a convergent result. Unfortunately, the ICP approach can result in a local minimum as shown in FIG. 4. In FIG. 3, when aligning mesh A to B, ICP simply pairs the closest points, which now becomes corresponding points. In FIG. 4, ICP can result in a local minimum. If ICP is initiated with A flipped compared to FIG. 3, the iteration can converge to a wrong alignment.

Although the ICP algorithm is a powerful technique for mesh registration, the discussion above indicates that the initial LPM position must be aligned to D. This initial positioning might have been straightforward if S was parameterized. However, as D is not yet landmarked, the parametrization procedure of Section 4.1 cannot be applied. However, ICP does not require fully accurate parameterization of D. The segmentation in Section 4.2 divides the body into non-symmetric shapes, which assist in effective ICP application even if initial-positioning is somewhat rough. D is referred after preliminarily parametrization as a preliminarily parameterized body (PPB).

5.2 Generation of the Preliminarily Parameterized Body

A technique may be used, which transforms an unmarked body into a PPB. The technique is as follows. First, an average geometry vector $\overline{x}$ of $(x)_1, \ldots, (x)_N$ is obtained and the deviation vectors $u_1, \ldots, u_N$. With the deviation matrix U, obtained by stacking the $u_i$ values, principal component analysis (PCA) is performed and obtain the components $p_1, \ldots, p_h$ (h=N) in the descending order of their corresponding variances $\sigma_1^2, \ldots, \sigma_h^2$. Next, the PPB surface geometry is generated using the weighted sum $$r = \overline{\Theta} + \sum_{q=1}^{h} w_q p_q. \quad (2)$$

Weights $w_1, \ldots, w_h$ are obtained by optimizing the weighted sum $\alpha E_p + (1-\alpha) E_d$, where the PCA deviation error $E_p$ and data error $E_d$ are defined as:

$$E_p = \sum_{q=1}^{h} (w_q / \sigma_q)^2, \quad (3)$$

and $$E_d = \sum_{k=1}^{n} dist^2(r_k, D), \quad (4)$$

where n is the number of vertices in r, and dist( ) is a function which returns the shortest distance between a vertex $r_k$ of r and the surface of D.

As each $p_q$ is parameterized, so also is the linear combination r. The PPB is thus represented by $\phi(r, K)$. In the first iteration of the ICP algorithm, $\phi(r, v_k)$ is taken as the point corresponding to $\phi((\overline{x})_I, v_k)$ instead of the closest point in D.

PPBs lack detailed geometric features but overall shapes resemble unmarked bodies and provide parameterization adequate for the ICP process. Any instances has been encountered, in which a PPB showed a problematical initial position.

6. EXPERIMENTS

Experiments were performed using a Windows XP environments. The method was embodied with Visual C++ and visualized with OpenGL API. 1025 landmarked bodies of CAESAR data were used for the experiments.

The landmarking accuracy of the proposed method was tested as follows. One individual (termed the subject) among the 1025 individuals was used, and the remaining 1024 individuals were regarded as the population. The (known) landmarks of the subject were considered to reflect prefect measurement accuracy, but temporarily these data were ignored to seek to landmark the subject using the novel procedure. The data was compared with the real values. BM landmarking error was measured by the Euclidian distance between the procedurally obtained landmark and the real datum.

Figure 5:
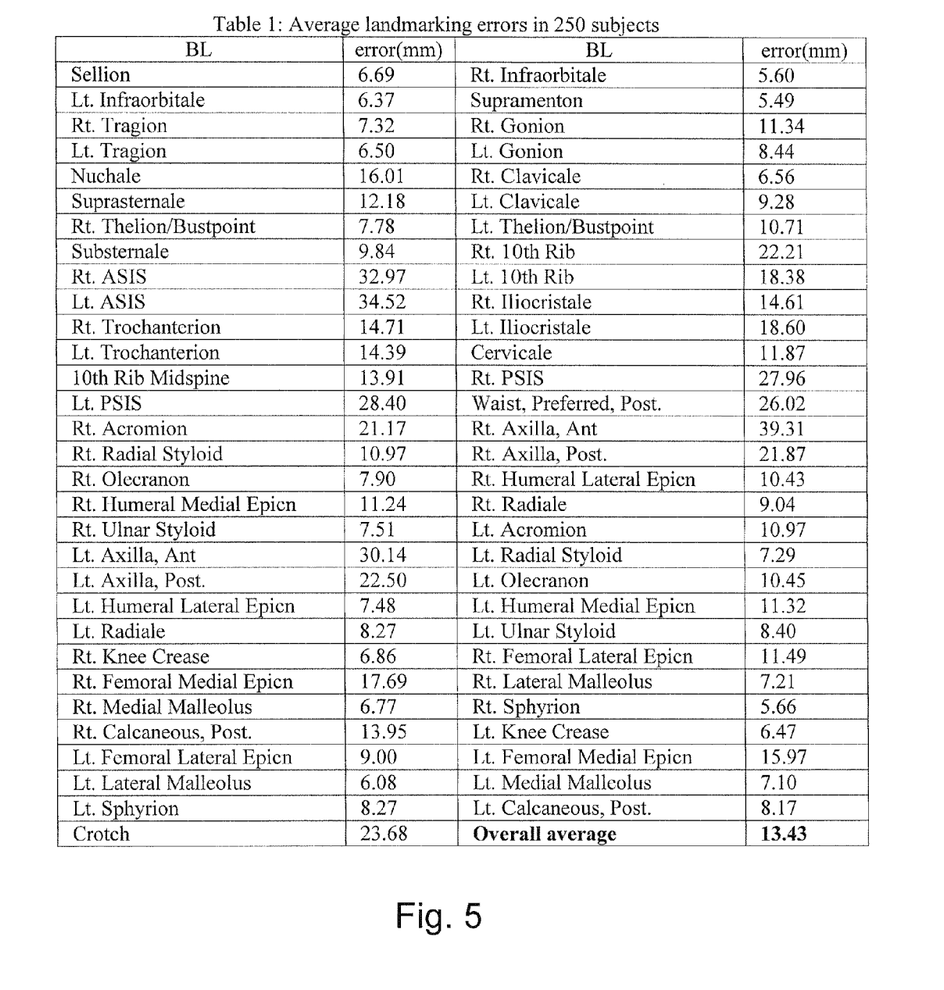
FIG. 5 is a table showing average landmarking errors in 250 subjects.

The test described above was performed on 250 individuals. Table I summarizes landmarking error averages in 61 BLs, and FIG. 4 shows both procedural and ground truth landmarking of three individuals. Although the mean of the 61 average errors was 1.34 cm, errors differed for various BLs.

It is noted that BLs yielding imprecise landmarking fall into two categories. BLs located in occluded regions (e.g., the axillia and crotch) are in the first category. Regions occluded from the scanner sensor remain as holes in the scanned geometry. Although professional measurers have attempted to mark the BLs in the missing regions, the accuracy does not match that achievable in normally scanned regions. The holes caused other complications which served to reduce the landmarking accuracy.

BLs located in less salient regions (e.g., ASIS, PSIS, tenth rib, posterior waist, and acromion) fall into the second category. These BLs are difficult to locate because the skeletal features are hard to identify using scanned surface geometry alone. In particular, ASIS, the anterior pelvic protrusion on the side of the belly shows the worst landmarking performance, because a thick layer of belly fat may obscure correspondence between the skeletal feature and the corresponding BL on the surface.

It is also noted that the ground truth landmarks of the CAESAR database were manually identified by trained measurers. The landmarking errors introduced by measurers may be discussed. As various measurers may mark BLs at different positions, the CAESAR landmarks cannot strictly serve as the final descriptors.

7. CONCLUSION

A novel example-driven approach for automatic landmarking of a 3D-scanned body is provided. In embodiments, BLs were identified by geometrical context. To facilitate context searches, each individual in a landmarked population was decomposed into part-meshes. Similarity between a part-mesh and the corresponding part of a given unmarked body were analyzed to find the best match. Next, best-matched part-meshes were projected onto the unmarked body to obtain the required landmarks.

The mean landmarking error of the proposed technique was about 1.34 cm. For some BLs, landmarking errors were noticeably larger than this average. This resulted from poor scanning, or inaccurate landmarking of less prominent regions. Considering that the acceptable error of the most traditional measurements is about 1 cm, except within the two categories noted above, the landmarking error of the present invention is reasonable.

The ICP approach was applied to part-wise matching. However, there are several advanced mesh registration techniques which it is planned to exploit to improve both accuracy and convergence.

Figure 1:
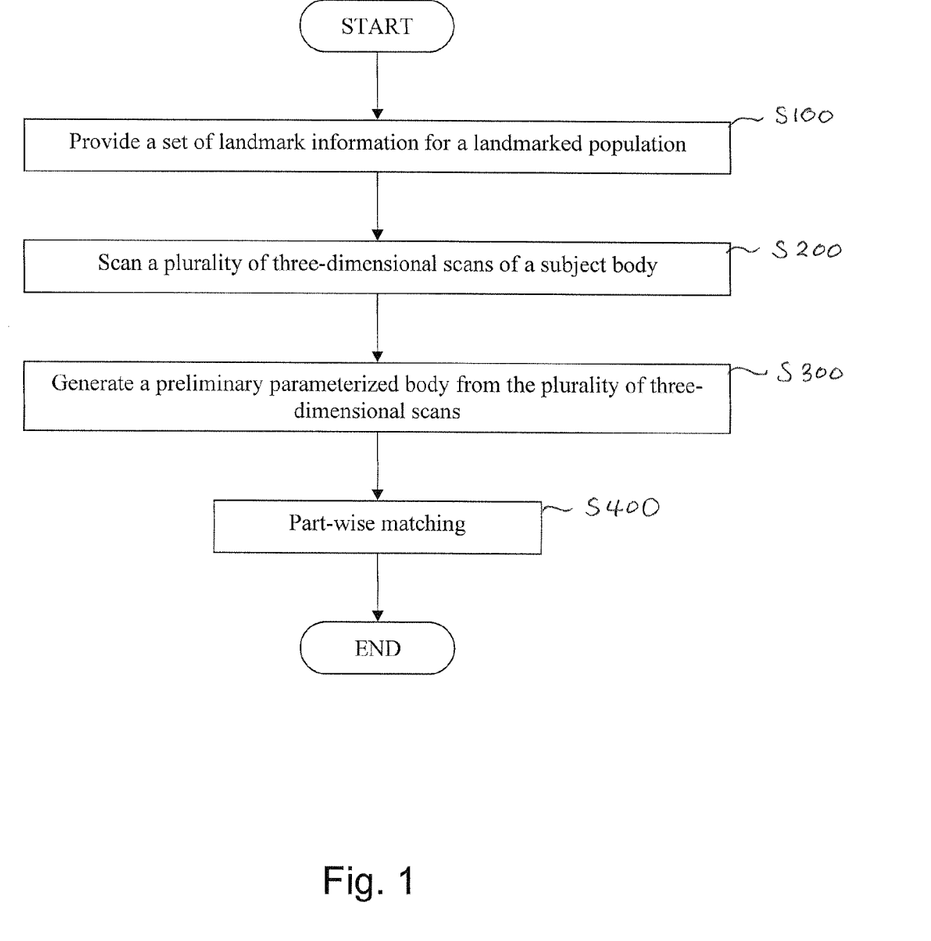
FIG. 1 is a flowchart illustrating a method for population-driven identification of body landmarks according to an embodiment of the invention.

An aspect of the invention provides a method, for population-driven identification of body landmarks comprising steps of:

providing a set of landmark information for a landmarked population, wherein three-dimensional landmarks are identified for each individual in the landmarked population, such that three-dimensional geometry of the each individual is obtained, wherein the landmark information of the each individual comprises a plurality of three-dimensional part meshes (S100);

scanning a plurality of three-dimensional scans of a subject body, a human body (S200);

generating a preliminary parameterized body from the plurality of three-dimensional scans (S300); and part-wise matching to find a best-matched landmarked part-mesh in the landmarked population to a given body part of the subject body and apply a body landmark (BL) thereof to the given body part (S400).

The step of providing (S100) may comprise steps of:

parameterizing each individual of the landmarked population through mesh transformation for establishing correspondence between body points of two arbitrary individuals in the landmarked population; and performing topological body segmentation on each individual of the landmarked population in order to obtain the three-dimensional part meshes.

The step of parameterizing may comprise steps of:

obtaining a template mesh;

transforming the mesh to optimally fit the landmarked individual; and constraining the template mesh landmarks to coincide with landmarks of the landmarked individual.

The body landmark may represent corresponding anatomical positions in terms of mesh topological structure of the mesh.

The step of part-wise matching (S400) may comprise steps of:

aligning/scaling the landmarked part-mesh around the subject body; and selecting a part-mesh with a lowest registration error, wherein the registration error is given as $$e_j^I = \frac{1}{m} \sum_{k=1, v_k \in P_j}^{m} Pc_k - T(\varphi(\Theta_I, v_k))P,$$

where T represents a transformation applied to a topological part-mesh $P_j$, m denotes the total number of vertices in that part-mesh, $v_k$ represents the k-th vertex in $P_j$ and $c_k$ denotes the corresponding vertex in D, $(x)_I$ is a geometry vector according to which a topological part-mesh $\kappa \in K$ is realized into an actual 3D part-mesh of the I-th body by constraining vertices, and $\phi((x)_I, \kappa)$ is a mapping in which a topological part-mesh $\kappa \in K$ can be realized into an actual 3D part-mesh of the I-th body by constraining vertices according to $(x)_I$.

The step of aligning/scaling may comprise an iterative-closest-point (TCP) algorithm.

The step of performing topological body segmentation may comprise a step of dividing the subject body into non-symmetric shapes.

The step of generating (S300) may comprise steps of:

obtaining an average geometry vector of $\overline{(x)}$ of $(x)_1, \ldots, (x)_N$ and the deviation vectors $u_1, \ldots u_N$ forming a deviation matrix U;

performing a principal component analysis (PCA) and obtaining the components $p_1, \ldots, p_h$ (h=N) in the descending order of corresponding variances $\sigma_1^2, \ldots, \sigma_h^2$; and generating the preliminary parameterizie body surface geometry using the weighted sum $$r = \overline{\Theta} + \sum_{q=1}^{h} w_q p_q,$$

where weights $w_1, \ldots, w_h$ are obtained by optimizing the weighted sum $\alpha E_p + (1-\alpha)E_d$, where the PCA deviation error $E_p$ and data error $E_d$ are defined as $$E_p = \sum_{q=1}^{h} (w_q / \sigma_q)^2,$$

and $$E_d = \sum_{k=1}^{n} dist^2(r_k, D),$$

where n is the number of vertices in r, and dist( ) is a function which returns the shortest distance between a vertex $r_k$ of r and the surface of D.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A method for population-driven identification of body landmarks comprising steps, performed in an information processing device, of:

providing a set of landmark information for a landmarked population, wherein three-dimensional landmarks are identified for each individual in the landmarked population, such that three-dimensional geometry of the each individual is obtained, wherein the landmark information of the each individual comprises a plurality of three-dimensional part meshes;

scanning a plurality of three-dimensional scans of a subject body, a human body;

generating a preliminary parameterized body from the plurality of three-dimensional scans; and part-wise matching to find a best-matched landmarked part-mesh in the landmarked population to a given body part of the subject body and apply a body landmark (BL) thereof to the given body part, wherein the step of providing comprises steps of:

parameterizing each individual of the landmarked population through mesh transformation for establishing correspondence between body points of two arbitrary individuals in the landmarked population; and performing topological body segmentation on each individual of the landmarked population in order to obtain the three-dimensional part meshes, wherein the step of part-wise matching comprises steps of:

aligning/scaling the landmarked part-mesh around the subject body; and selecting a part-mesh with a lowest registration error, wherein the registration error is given as $$e_j^I = \frac{1}{m} \sum_{k=1, v_k \in P_j}^{m} Pc_k - T(\varphi(\Theta_I, v_k))P,$$

where T represents a transformation applied to a topological part-mesh $P_j$, m denotes the total number of vertices in that part-mesh, $v_k$ represents the k-th vertex in $P_j$ and $c_k$ denotes the corresponding vertex in D, $(\overline{x})_I$ is a geometry vector according to which a topological part-mesh $\kappa \in K$ is realized into an actual 3D part-mesh of the I-th body by constraining vertices, and $\phi((\overline{x})_I, \kappa)$ is a mapping in which a topological part-mesh $\kappa \in K$ can be realized into an actual 3D part-mesh of the I-th body by constraining vertices according to $(\overline{x})_I$.

2. The method of claim 1, wherein the step of parameterizing comprises steps of:
   obtaining a template mesh;
   transforming the mesh to optimally fit the landmarked individual; and
   constraining the template mesh landmarks to coincide with landmarks of the landmarked individual.

3. The method of claim 1, wherein the body landmark represents corresponding anatomical positions in terms of mesh topological structure of the mesh.

4. The method of claim 1, wherein the step of aligning/scaling comprises an iterative-closest-point (ICP) algorithm.

5. The method of claim 4, wherein the step of performing topological body segmentation comprises a step of dividing the subject body into non-symmetric shapes.

6. The method of claim 1, wherein the step of generating comprises steps of:
   obtaining an average geometry vector $\overline{(x)}$ of $(\overline{x})_1, \ldots, (\overline{x})_N$ and the deviation vectors $u_1, \ldots, u_N$ forming a deviation matrix U;
   performing a principal component analysis (PCA) and obtaining the components $p_1, \ldots, p_h$ (h=N) in the descending order of corresponding variances $\sigma_1^2, \ldots, \sigma_h^2$; and
   generating the preliminary parameterizie body surface geometry using the weighted sum $$r = \overline{\Theta} + \sum_{q=1}^{h} w_q p_q,$$

where weights $w_1, \ldots, w_h$ are obtained by optimizing the weighted sum $\alpha E_p + (1-\alpha) E_d$, where the PCA deviation error $E_p$ and data error $E_d$ are defined as:

$$E_p = \sum_{q=1}^{h} (w_q / \sigma_q)^2,$$

and $$E_d = \sum_{k=1}^{n} \mathit{dist}^2(r_k, D),$$

where n is the number of vertices in r, and dist ( ) is a function which returns the shortest distance between a vertex $r_k$ of r and the surface of D.

* * * * *